(12) United States Patent
Iwashita et al.

(10) Patent No.: US 9,018,886 B2
(45) Date of Patent: Apr. 28, 2015

(54) MOTOR CONTROL SYSTEM WHICH CORRECTS BACKLASH

(71) Applicant: Fanuc Corporation, Minamitsuru-gun, Yamanashi (JP)

(72) Inventors: Yasusuke Iwashita, Yamanashi (JP); Kenichi Takayama, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 14 days.

(21) Appl. No.: 14/018,373

(22) Filed: Sep. 4, 2013

(65) Prior Publication Data

US 2014/0062378 A1    Mar. 6, 2014

(30) Foreign Application Priority Data

Sep. 5, 2012   (JP) .................. 2012-195098

(51) Int. Cl.
  *G05B 11/01*   (2006.01)
  *B23Q 23/00*   (2006.01)
  *G05B 19/404*   (2006.01)

(52) U.S. Cl.
  CPC .............. *B23Q 23/00* (2013.01); *G05B 19/404* (2013.01); *G05B 2219/41059* (2013.01); *G05B 2219/41265* (2013.01)

(58) Field of Classification Search
  USPC .................. 318/560, 630, 632, 823
  See application file for complete search history.

(56) References Cited

U.S. PATENT DOCUMENTS 5,210,478 A * 5/1993 Sasaki et al. .................. 318/632
5,691,616 A * 11/1997 Iwashita ....................... 318/615
2002/0151988 A1* 10/2002 Shiba et al. .................. 700/13
2003/0030401 A1   2/2003 Fujishima
2014/0197773 A1* 7/2014 Ikai et al. ..................... 318/630

FOREIGN PATENT DOCUMENTS

| JP | 490209 U | 8/1992 |
| JP | 876847 A | 3/1996 |
| JP | 8179831 A | 7/1996 |
| JP | 3129622 B2 | 1/2001 |
| JP | 200348136 A | 2/2003 |
| JP | 3389417 B2 | 3/2003 |
| JP | 2003157114 A | 5/2003 |
| JP | 3703664 B2 | 10/2005 |
| JP | 4030747 B2 | 1/2008 |
| JP | 2010284015 A | 12/2010 |
| JP | 4901912 B2 | 3/2012 |

* cited by examiner

*Primary Examiner* — Rina Duda
*Assistant Examiner* — Bickey Dhakal
(74) *Attorney, Agent, or Firm* — Lowe Hauptman & Ham, LLP (57) ABSTRACT

A motor control system (10) which includes a difference calculating part (31) which calculates a difference between a first position detection value of a moving part and a second position detection value of a driven part, a judging part (32) which judges if a moving part has engaged with the driven part when the moving part is made to move from any initial position in a first and second drive directions, a holding part (33) which holds the difference as initial difference linked with the first or second drive direction, when the moving part has engaged with the driven part, and a correction amount calculating part (34) which calculates a backlash correction amount, the correction amount calculating part using the difference based on the current positions of the moving part and the driven part and the initial difference to calculate the backlash correction amount.

7 Claims, 11 Drawing Sheets

MOTOR CONTROL SYSTEM WHICH CORRECTS BACKLASH

RELATED APPLICATIONS

The present application is based on, and claims priority from, Japanese Application Number 2012-195098, filed Sep. 5, 2012, the disclosure of which is hereby incorporated by reference herein in its entirety.

BACKGROUND OF THE INVENTION

1. Field of the Invention

The present invention relates to a motor control system which corrects backlash.

2. Description of the Related Art

The feed axis in machine tools and industrial machinery and the axis of arms etc. of industrial robots (mechanical moving parts) have servo motors coupled with them. Rotation of the servo motors is converted by ball screws etc. to linear motion of tables etc. The speed of transmission of the servo motors is slowed by reduction gears.

There is sometimes a difference between the stopping position in a positive direction to a certain position and the stopping position in a negative direction in these ball screws or reduction gears. In general, such a difference is called "backlash" and is a cause of reduction of positional accuracy.

Figure 10A:
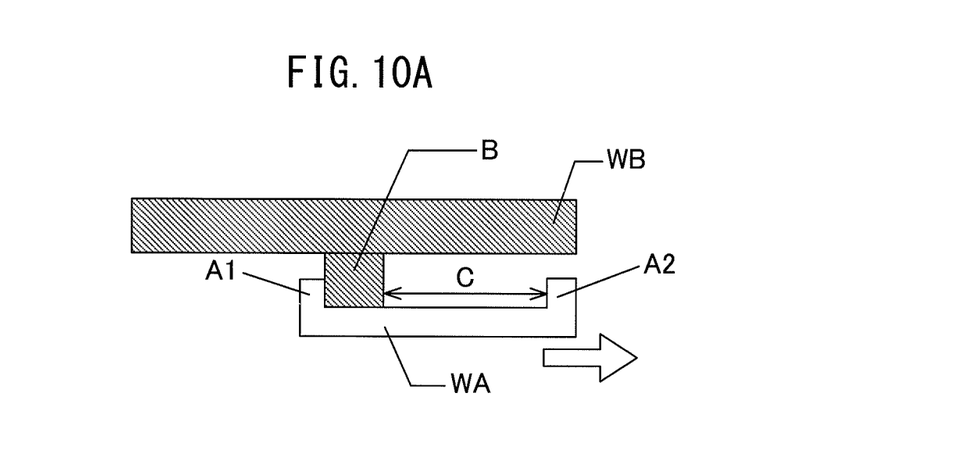
FIG. 10A is a first view for explaining backlash.
Figure 10B:
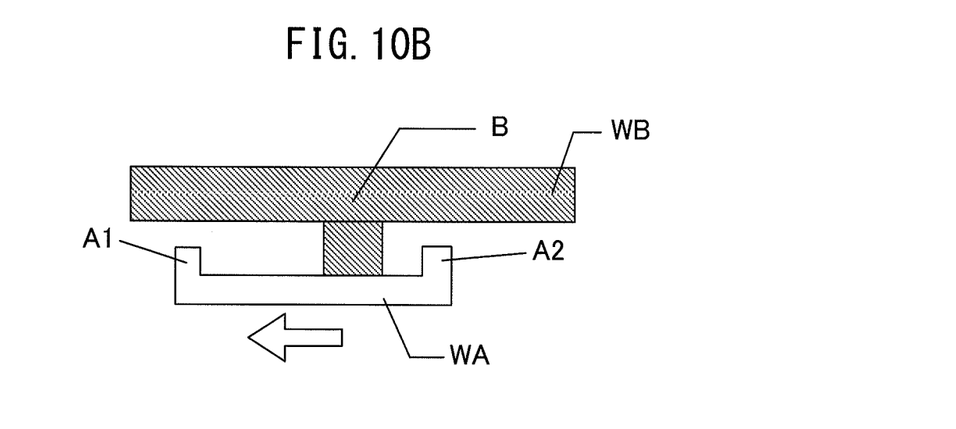
FIG. 10B is a second view for explaining backlash.
Figure 10C:
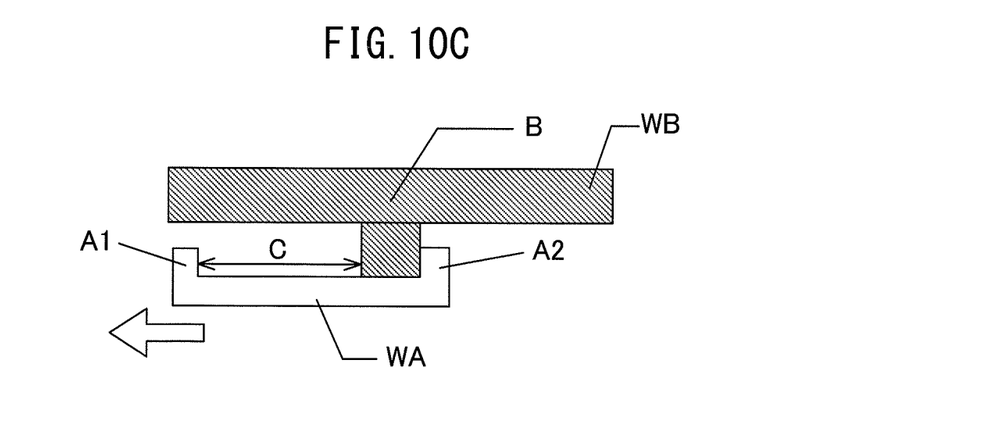
FIG. 10C is a third view for explaining backlash.

FIG. 10A and FIG. 10C are views for explaining backlash. FIG. 10A shows a moving part WA which moves by a not shown motor and a driven part WB which is driven by the moving part WA. The moving part WA has projecting parts A1 and A2 at its two ends, while the driven part WB has a projecting part B at its center. Therefore, for example, if the moving part WA moves in the right direction, the inside end of the projecting part A1 of the moving part WA engages with one end of the projecting part B of the driven part WB. Due to this, the moving part WA and the driven part WB move integrally in the right direction.

Further, when the moving part WA reverses and moves from the right direction to the left direction, as shown in FIG. 10B, the moving part WA moves in the left direction. Further, as shown in FIG. 10C, when the inside end of the other projecting part A2 of the moving part WA engages with the other end of the projecting part B of the driven part WB, the moving part WA and the driven part WB move integrally in the left direction.

Before the moving part WA engages with the driven part WB at the time of reversal in this way, it is necessary for it to move by exactly a predetermined amount of movement called "backlash". FIG. 10A and FIG. 10C show the backlash C. The backlash C can become a cause of reduction of the positional accuracy.

For this reason, the practice has been to prepare a correction amount for the backlash C and add this correction amount to the position command of the motor at the time of reversal. Japanese Patent No. 3389417 discloses to find in advance the relationship of a feed speed before reversal and a correction amount for an amount of movement until reversal at the different feed axis and to use this relationship as the basis to find the correction amount. Further, Japanese Patent No. 3703664 discloses to update the correction amount in accordance with the time elapsed after reversal.

Figure 11:
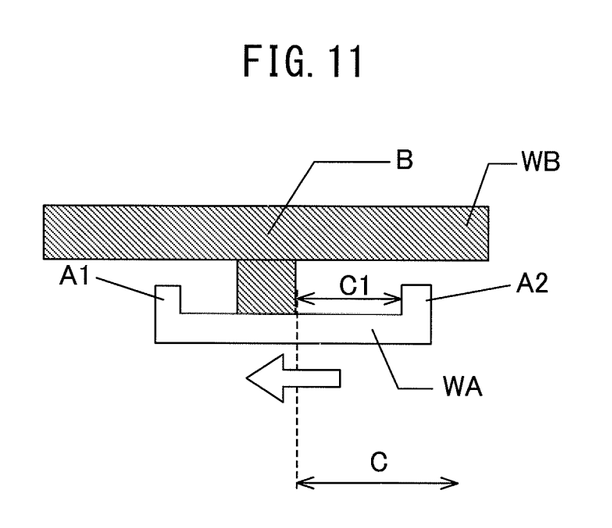
FIG. 11 is another view for explaining backlash.

In this regard, FIG. 11 is another view for explaining backlash. FIG. 11 shows an initial position where neither of the projecting parts A1 and A2 of the moving part WA are engaged with ends of the projecting part B of the driven part WB. If the moving part WA is made to move in the left direction from such an initial position, the moving part WA moves by exactly a distance C1 shorter than the backlash C whereby it engages with the other end of the projecting part B of the driven part WB (see FIG. 10C). Such a phenomenon easily occurs when the backlash is relatively large.

However, if adding a correction amount corresponding to the backlash C to the position command of the motor even in such a case, the correction amount would become excessively large. To keep the correction amount from becoming excessively large, it is also possible to prepare a predetermined correction amount which is smaller than the backlash C. However, if making the correction amount too small, sometimes the correction amount becomes insufficient at the time of reversal.

The present invention was made in consideration of such a situation and has as its object to provide a motor control system which can prepare the optimum correction amount even if the amount of movement from the initial position is smaller than the backlash.

SUMMARY OF INVENTION

To achieve the above-mentioned object, according to a first aspect of the invention, there is provided a motor control system which corrects a backlash between a moving part which is driven by a motor and a driven part which is driven by that moving part, the motor control system comprising a first position detecting part which detects a position of the moving part, a second position detecting part which detects a position of the driven part, a difference calculating part which calculates a difference between a first position detection value which the first position detecting part detects and a second position detection value which the second position detecting part detects, a judging part which judges if the moving part has engaged with the driven part when the moving part is made to move from any initial position in a first drive direction and in a second driven direction opposite to the first drive direction, a holding part which holds the difference calculated by the error calculating part as initial difference linked with the first drive direction or the second drive direction, when the judging part judges that the moving part has engaged with the driven part, and a correction amount calculating part which calculates a backlash correction amount of the backlash, wherein the correction amount calculating part using the difference calculated by the error calculating part based on the current positions of the moving part and the driven part and the initial difference held by the holding part to calculate the backlash correction amount.

According to a second aspect of the invention, there is provided the first aspect of the invention wherein the judging part judges that the moving part has engaged with the driven part when the moving part moves in the first drive direction or the second drive direction by the backlash or more.

According to a third aspect of the invention, there is provided the second aspect of the invention wherein the judging part judges that the moving part has engaged with the driven part when the moving part has moved by a certain speed.

According to a fourth aspect of the invention, there is provided the first aspect of the invention further comprising a position command preparing part which prepares a position command value of the driven part and a speed command preparing part which uses a first position difference between the position command value and the first position detection value and a second position difference between the position command value and the second position detection value as the basis to prepare a speed command value.

According to a fifth aspect of the invention, there is provided the fourth aspect of the invention wherein the speed command preparing part applies a low pass filter to a error between the second position difference and the first position difference and adds the first position difference to the result to prepare a speed command.

According to a sixth aspect of the invention, there is provided the fourth aspect of the invention wherein the holding part further holds speed command values in the first drive direction and the second drive direction and, when a current speed command value is smaller than a held speed command value, holds the current speed command value as a new speed command value.

According to a seventh aspect of the invention, there is provided the first aspect of the invention wherein the correction amount calculating part limits the correction amount of backlash to the backlash amount or less.

These objects, features, and advantages of the present invention and other objects, features, and advantages will become further clearer from the detailed description of typical embodiments of the present invention which are shown in the attached drawings.

DETAILED DESCRIPTION

Below, the attached drawings will be referred to so as to explain embodiments of the present invention. In the following drawings, the same members are assigned similar reference notations. To facilitate understanding, these drawings are suitably changed in scale.

Figure 1:
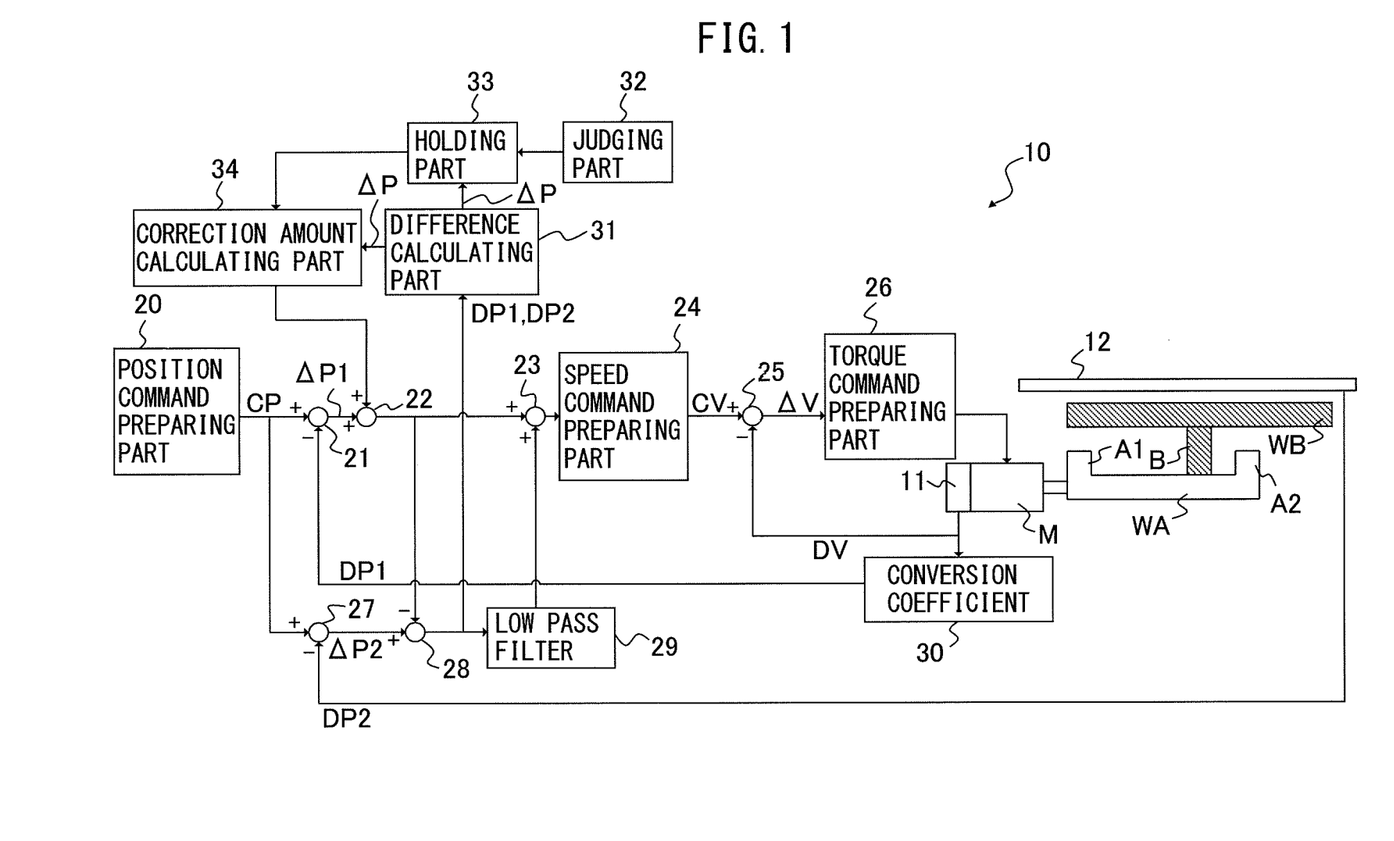
FIG. 1 is a functional block diagram of a motor control system according to a first embodiment of the present invention.

FIG. 1 is a functional block diagram of a motor control system according to a first embodiment of the present invention. As shown in FIG. 1, a moving part WA which is provided with projecting parts A1 and A2 is attached to an output axis of a motor M through a screw. Further, a driven part WB which is provided with a projecting part B is arranged to be able to engage with the moving part WA.

As explained with reference to FIG. 10A, there is a backlash C between the moving part WA and driven part WB. The backlash C is found by measuring the distance of movement of the moving part WA by a 3D measuring device etc., comparing this with the amount of movement of the motor M, and measuring the difference. Alternatively, it is possible to find the backlash C by measuring the so-called quadrant glitches which occur when the quadrant is changed.

As shown in FIG. 1, a first position detecting part 11, for example, an encoder, which detects the position of the moving part WA is attached to the motor M. This first position detecting part 11 can use a known method to detect the speed of the moving part WA. Furthermore, a second position detecting part 12 which detects the position of the driven part WB is arranged adjoining the driven part WB.

The motor control system 10 mainly includes a position command preparing part 20 which periodically prepares a position command value CP of the moving part WA, a speed command preparing part 24 which prepares a speed command of the moving part WA, and a torque command preparing part 26 which prepares a torque command of a motor M.

Furthermore, the motor control system 10 includes a difference calculating part 31 which calculates a difference $\Delta P$ between a first position detection value DP1 which the first position detecting part 11 detects and a second position detection value DP2 which the second position detecting part 12 detects. Further, the motor control system 10 includes a judging part 32 which judges if the moving part WA has engaged with the driven part WB when making the moving part WA move from any initial position in a first drive direction and a second drive direction opposite to the first drive direction.

Further, the motor control system 10 includes a holding part 33 which holds difference $\Delta P$ calculated by the difference calculating part 31 as initial difference $\Delta P0$ linked with the first drive direction or the second drive direction when it was judged by the judging part 32 that the moving part WA engaged with the driven part WB. Note that, the holding part 33 can also hold the speed or other factors. Further, the motor control system 10 includes a correction amount calculating part 34 which calculates the backlash correction amount for eliminating backlash.

Figure 2:
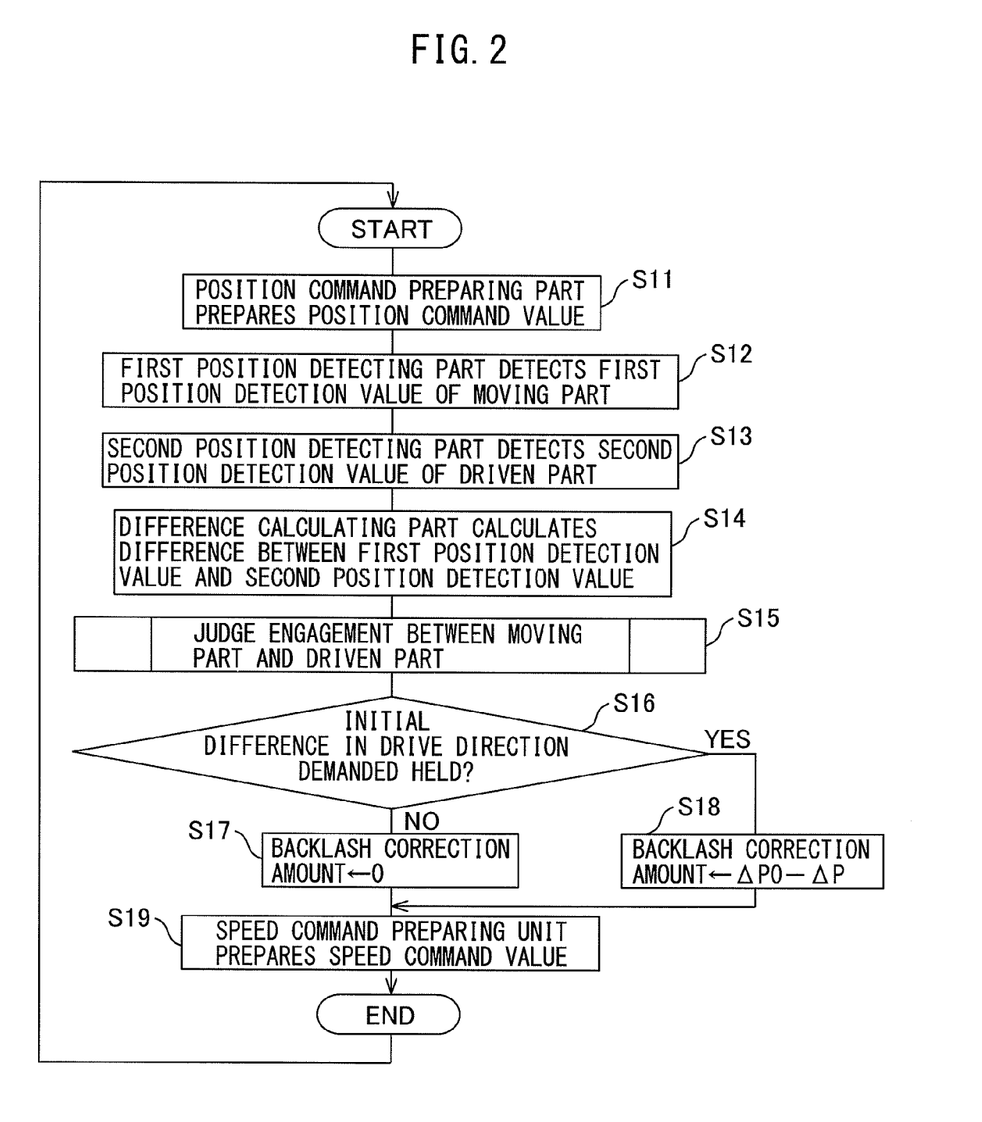
FIG. 2 is a flow chart which shows the operation of the motor control system of the present invention.

FIG. 2 is a flow chart which shows the operation of the motor control system of the present invention. The content which is shown in FIG. 2 is assumed to be performed repeatedly every predetermined control period. Below, referring to FIG. 1 and FIG. 2, the operation of the motor control system of the present invention will be explained.

First, at step S11 of FIG. 2, the position command preparing part 20 prepares a position command value CP. Then, at steps S12 and S13, the first position detecting part 11 and the second position detecting part 12 respectively detect the first position detection value DP1 of the moving part WA and the second position detecting part DP2 of the driven part WB.

As shown in FIG. 1, the first position detection value DP1 which was detected by the first position detecting part 11 is subtracted at the subtractor 21 from the position command value CP which was prepared by the position command preparing part 20 whereby the first position difference $\Delta P1$ is prepared. Note that, as will be understood from FIG. 1, the first position detection value DP1 is multiplied with a conversion coefficient 30.

Furthermore, the second position detection value DP2 which was detected by the second position detecting part 12 is subtracted at the subtractor 27 from the position command value CP whereby the second position difference $\Delta P2$ is prepared. At the subtractor 28, the first position difference $\Delta P1$ is subtracted from the second position difference $\Delta P2$ and the result passed through a low pass filter 29 to be input to the adder 23. Here, the reason for using the low pass filter 29 is that when the change in the position difference is large, control of the position by the position detection value from the first position detecting part enables stable movement of the moving part and that when the change in the position difference is small, control of the position by the position detection value from the second position detecting part improves the precision of the position of the moved part.

The first position difference $\Delta P1$ and the second position difference $\Delta P2$ which were added by the adder 23 are input to the speed command value preparing part 24 whereby the speed command value CV is prepared. Furthermore, the speed detection value DV which is detected by the first position detecting part 11 is subtracted at the subtractor 25 from the speed command value CV whereby the speed difference $\Delta V$ is calculated. Then, the torque command value preparing part 26 uses the speed difference $\Delta V$ as the basis to prepare the torque command value and inputs this to the motor M. Note that, the prepared speed command value CV and speed detection value DV are successively held at the holding part 33.

As can be seen from FIG. 1, in the present invention, the value of the second position difference $\Delta P2$ minus the first position difference $\Delta P1$ is input to the difference calculating part 31. At this value, the position command value CP is substantially excluded. Therefore, the difference calculating part 31 can easily calculate the difference $\Delta P$ between the first position detection value DP1 and the second position detection value DP2 (step S14). Alternatively, the first position difference $\Delta P1$ and second position difference $\Delta P2$ may be directly input to the difference calculating part 31 to prepare the difference $\Delta P$.

Figure 3:
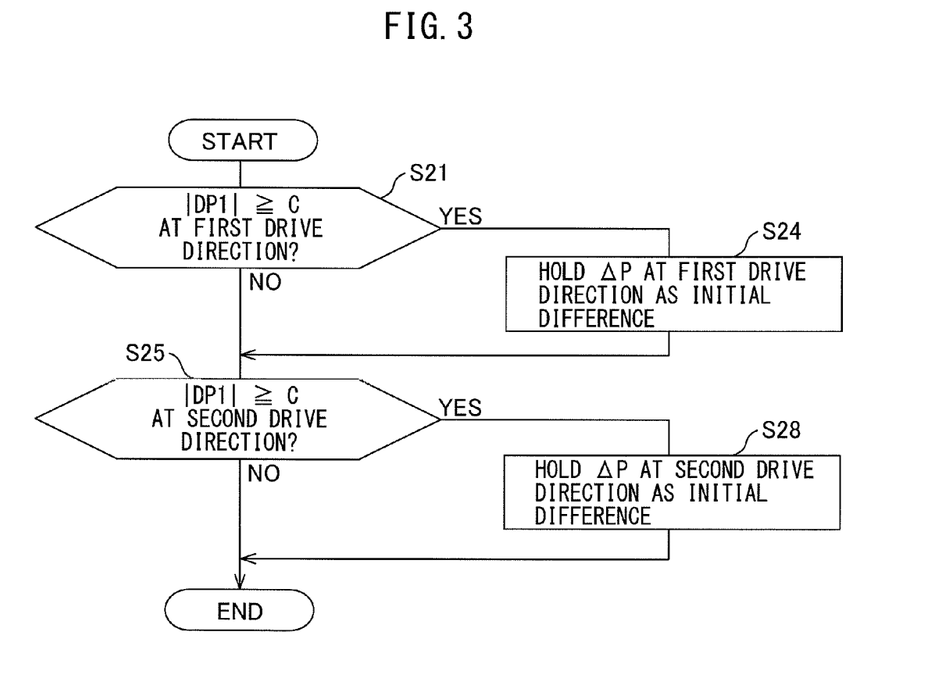
FIG. 3 is a first flow chart for judging if a moving part and a driven part are engaged.
Figure 4A:
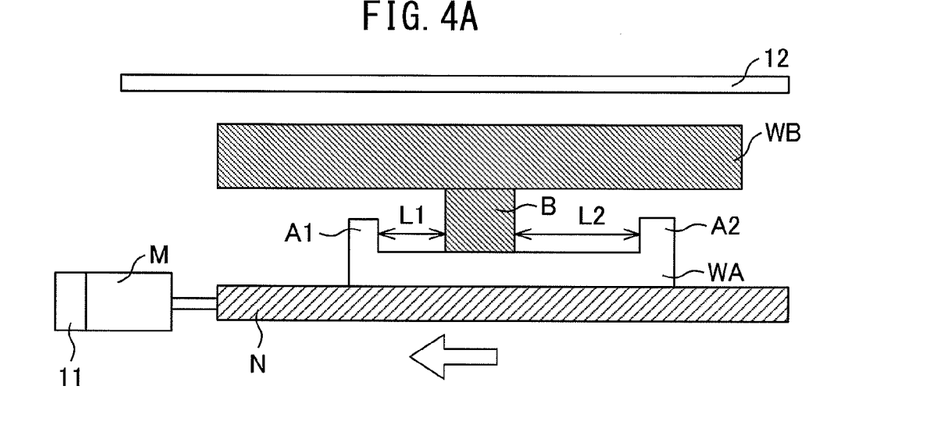
FIG. 4A is a side view of a moving part and driven part at initial positions.
Figure 4B:
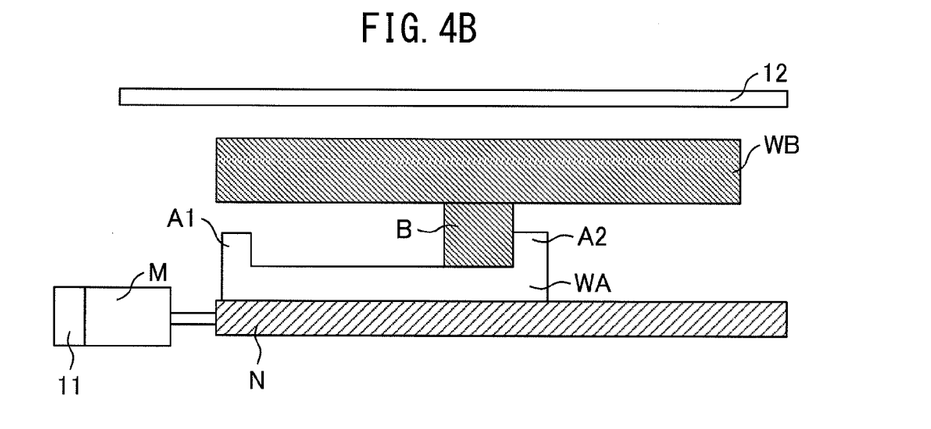
FIG. 4B is a side view similar to FIG. 4A when one projecting part of a moving part has engaged with the driven part.
Figure 4C:
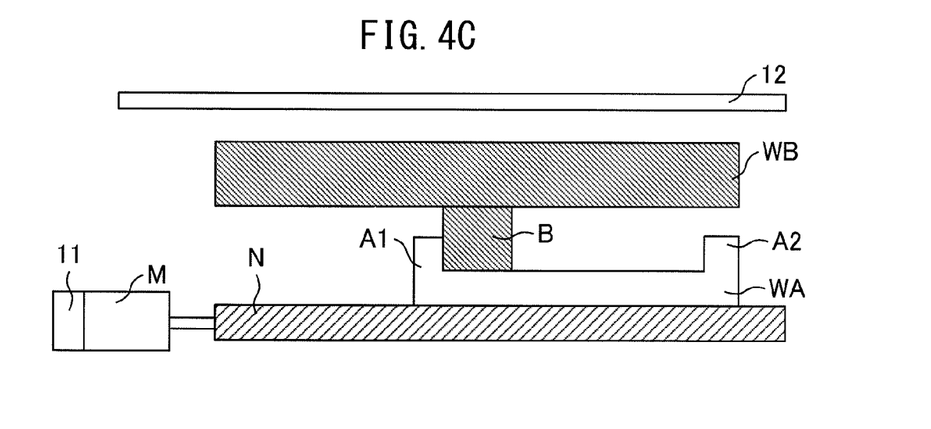
FIG. 4C is a side view similar to FIG. 4A when another projecting part of a moving part has engaged with the driven part.

After that, as shown in step S15, the judging part 32 judges if the moving part WA and the driven part WB have engaged. FIG. 3 is a first flow chart which judges if the moving part and the driven part have engaged. Further, FIG. 4A is a side view of the moving part and driven part at the initial position. Furthermore, FIG. 4B and FIG. 4C are side views similar to FIG. 4A when a projecting part of the moving part have engaged with the driven part. Below, while referring to FIG. 3 to FIG. 4C, the judgment as to if the moving part WA and the driven part WB have engaged will be explained.

The initial state which is shown in FIG. 4A is one example. In FIG. 4A, the projecting part B of the driven part WB is present at a position between the two projecting parts A1 and A2 of the moving part WA. The projecting part B of the driven part WB may be at any position between the two projecting parts A1 and A2 of the moving part WA. Further, the left direction in FIG. 4A to FIG. 4C is made the first drive direction while the right direction is made the second drive direction. For example, the first drive direction is the plus direction, while the second drive direction is the minus direction.

Further, when the moving part is a ball screw and the driven part is joined by a nut, the moving part WA is the screw N which is coupled with the output axis of the motor M while the projecting parts A1 and A2 correspond to the threads of the ball screw. When the moving part is a nut and the driven part is a ball screw, the projecting parts A1 and A2 correspond to the threads of the nut. Furthermore, due to the position command value from the position command preparing part 20, the motor M is suitably reversed. The moving part WA suitably moves in the first drive direction and second drive direction.

At step S21 of FIG. 3, it is judged if the absolute value of the amount of movement of the first position detection value DP1 of the moving part WA which is detected by the first position detecting part 11 at the first drive direction is the backlash C or more. Note that, the amount of movement of the first position detection value DP1 is cleared to zero when the direction reverses (when the first drive direction changes to the second drive direction or when the second drive direction changes to the first drive direction) so becomes an amount of movement which is cumulatively added only during movement in the same direction. When it is judged YES, it is judged that the projecting part A2 of the moving part WA and the projecting part B of the driven part WB have engaged (see FIG. 4B). Further, at step S24, the difference $\Delta P$ at the first drive direction is held as the initial difference $\Delta P0$ at the holding part 33 with a sign.

Further, when it is judged NO at step S21, the routine proceeds to step S25 where it is judged if the absolute value of the first position detection value DP1 of the moving part WA which is detected by the first position detecting part 11 at the second drive direction is the backlash C or more. Note that, the amount of movement of the first position detection value DP1 is cleared to zero when the direction reverses (when the first drive direction changes to the second drive direction or when the second drive direction changes to the first drive direction) so becomes an amount of movement which is cumulatively added only during movement in the same direction. When judged YES, it is judged that the projecting part A1 of the moving part WA and the projecting part B of the driven part WB have engaged (see FIG. 4C). Further, at step S28, the difference $\Delta P$ at the second drive direction is held as the initial difference $\Delta P0$ at the holding part 33 with a sign.

Note that, when the moving part WA moves from the initial position which is shown in FIG. 4A, the difference $\Delta P$ at step S24 of FIG. 3 corresponds to the distance L2. Similarly, the difference $\Delta P$ at step S28 of FIG. 3 corresponds to the distance L1.

Further, as can be seen from FIG. 4A, if the moving part WA moves in the first drive direction by exactly the distance L2, the projecting part A2 of the moving part WA and the projecting part B of the driven part WB engage. However, it is unclear at the initial position where the projecting part B of the driven part WB is positioned between the two projecting parts A1 and A2 of the moving part WA. Therefore, in the present invention, when moving by exactly the backlash C (=L1+L2), it is judged that the moving part WA and the driven part WB have been engaged.

In this regard, sometimes the initial difference $\Delta P0$ in the first drive direction and the initial difference $\Delta P$ in the second drive direction are not updated after being once stored and sometimes are updated when the condition of the absolute value of the amount of movement of the first position detection value DP1 of the moving part WA which is detected by the first position detecting part 11 at the first drive direction being the backlash C or more is satisfied.

Figure 8:
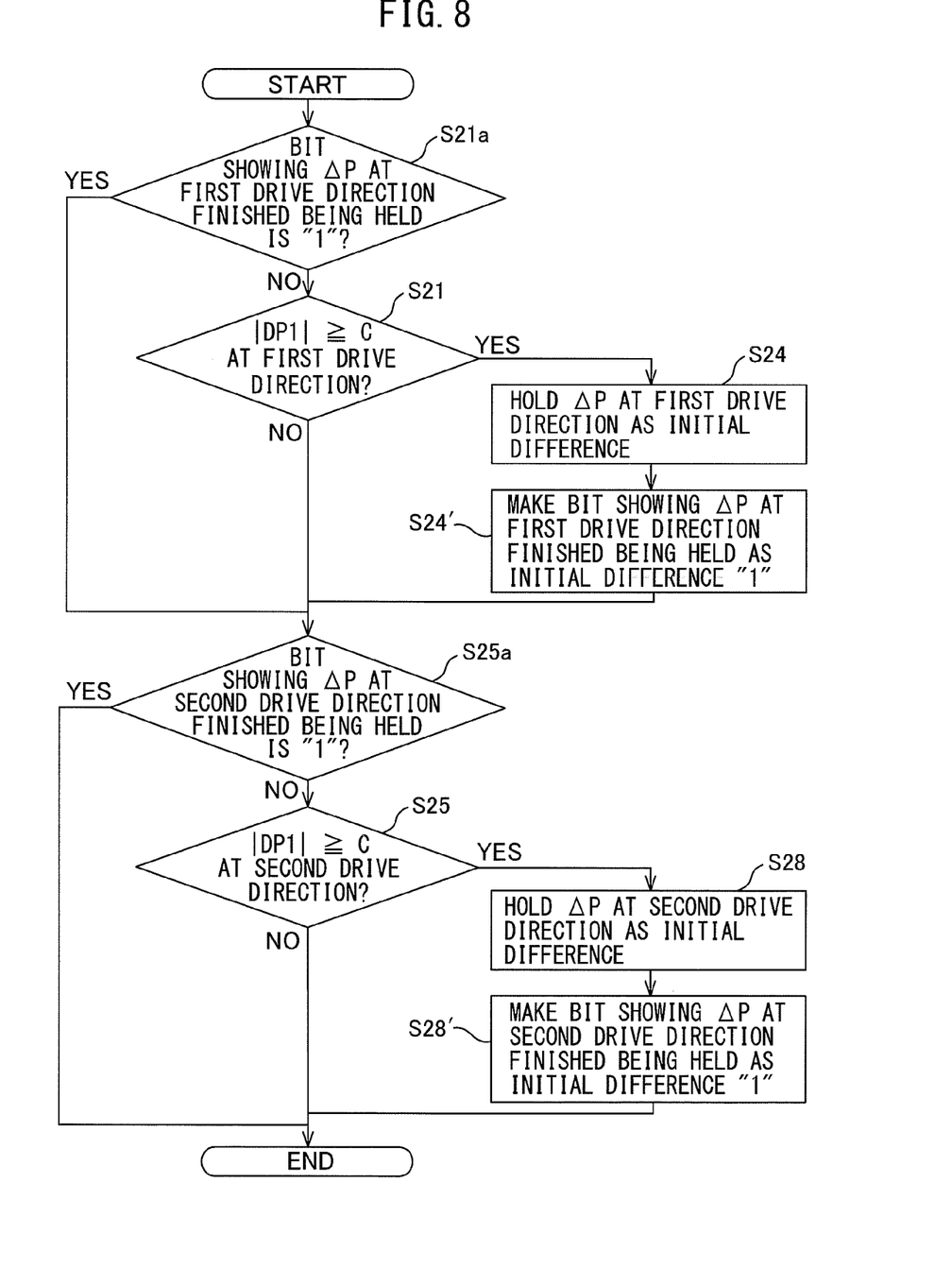
FIG. 8 is another flow chart for judging if a moving part and a driven part are engaged.

FIG. 8 is another flow chart which judges if the moving part and the driven part are engaged and is a view similar to FIG. 3. As shown in FIG. 8, a bit is set which shows that the initial difference has finished being stored when stored once, then not updated. If the bit is set, it is not updated (step S21a, S25a). As shown at steps S24' and S28' of FIG. 8, bits are preferably provided for the first drive direction and the second drive direction.

Referring again to FIG. 2, at step S16, it is judged whether the difference $\Delta P$ of the initial difference $\Delta P0$ in the drive direction which is currently demanded is held at the holding part 33. When not held, the routine proceeds to step S17. In this case, it shows that in the past, the projecting part B of the driven part WB is not engaged with the projecting part A1 or A2 in the drive direction which the moving part WA demands. The necessary backlash is not known. Therefore, the correction amount calculating part 34 sets the backlash correction amount to zero.

As opposed to this, when the difference ΔP is held at the holding part 33, the routine proceeds to step S18. In this case, it is shown which of the projecting parts A1 and A2 of the moving part WA the projecting part B of the driven part WB has engaged with in the drive direction demanded in the past. The necessary backlash in the drive direction is therefore learned. At step S18, the correction amount calculating part 34 sets the backlash correction amount as the initial difference ΔP0 in the drive direction demanded minus the current difference ΔP.

In this connection, referring to FIG. 1, the backlash correction amount which is prepared by the correction amount calculating part 34 is added at the adder 22 to the first position difference ΔP1. Further, the added value is supplied through the adder 23 to the speed command preparing part 24 where a speed command value CV is prepared (step S19). Finally, at the torque command preparing part 26, a torque command value is prepared.

In this way, in the present invention, the difference ΔP between the current positions of the moving part WA and the driven part WB and the initial difference ΔP0 which is held at the holding part 33 are used as the basis to calculate the backlash correction amount. Therefore, it is possible to prepare the optimum backlash correction amount for the current positions of the moving part WA and the driven part WB.

In this regard, in FIG. 3, the absolute value of the first position detection value DP1 was used as the basis to judge engagement of the part WA and the driven part WB. However, other factors may be used as the basis to judge engagement of the moving part WA and the driven part WB.

Figure 5:
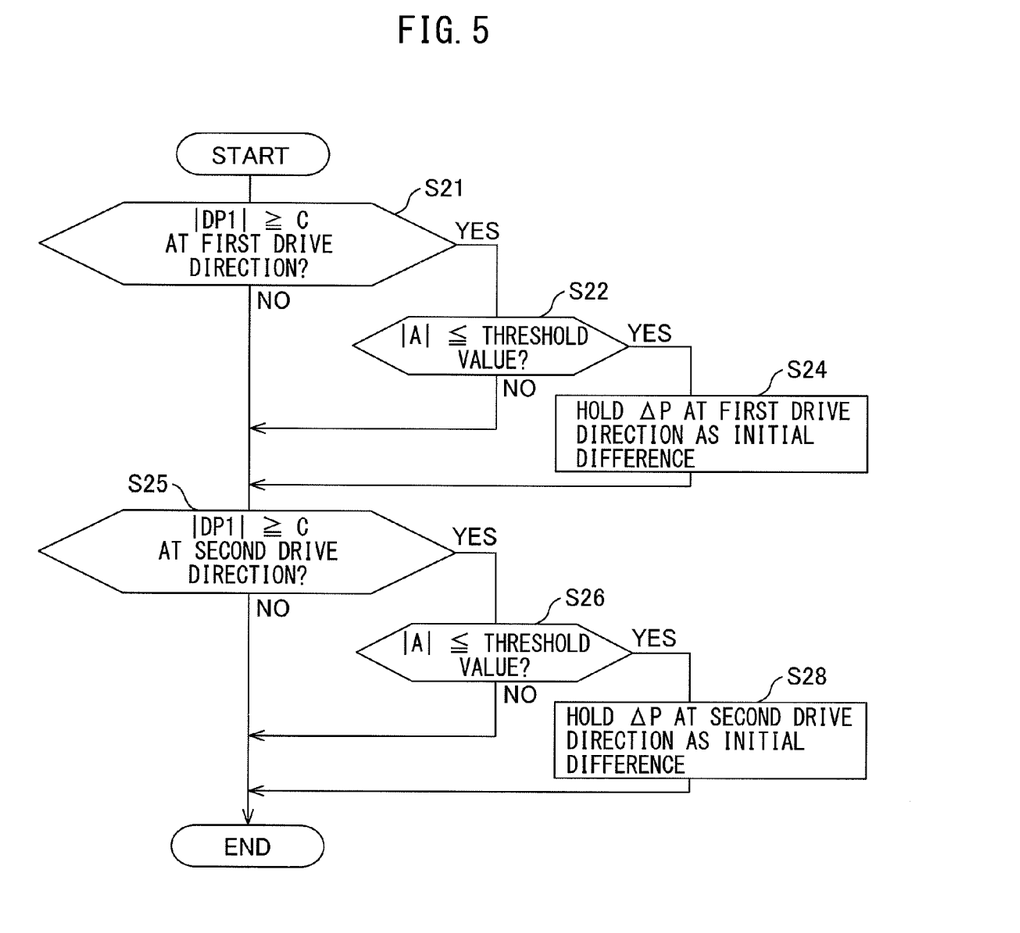
FIG. 5 is a second flow chart for judging if a moving part and a driven part are engaged.

FIG. 5 is a second flow chart for judging if a moving part and a driven part are engaged. Among the steps which are shown in FIG. 5, repeat explanations of steps similar to those which were explained with reference to FIG. 3 will be omitted.

In FIG. 5, when it is judged YES at step S21, the routine proceeds to step S22. At step S22, a plurality of consecutive speed command values CV or speed detection values DV are used as the basis to calculate the acceleration degree A for the first or second drive direction. This calculation is performed by the judging part 32. Further, the absolute value of the acceleration degree A is compared with a predetermined threshold value. This predetermined threshold value is zero or a positive value close to zero. When the absolute value of the acceleration degree A is a predetermined threshold value or less, the routine proceeds to step S24.

Similarly, when it is judged YES at step S25, the routine proceeds to step S26. Further, the absolute value of the acceleration degree A which was calculated for the first or second drive direction is compared with the above-mentioned predetermined threshold value. When the absolute value of the acceleration degree A is a predetermined threshold value or less, the routine proceeds to step S28.

When the absolute value of the acceleration degree A is a predetermined threshold value or less at step S22 and step S26, it can be judged that the moving part WA is moving generally at a certain speed and almost no acceleration or deceleration occurs. In such a case, it can be judged that acceleration or deceleration has not caused deformation of the axis of movement of the moving part WA (screw N).

Further, when at step S22 and step S26 the absolute value of the acceleration degree A is a predetermined threshold value or less, the routines proceed to step S24 and step S28 respectively where the difference ΔP is held as the initial difference ΔP0. When such initial difference ΔP0 is used as the basis to prepare a backlash correction amount, it is possible to find an accurate backlash correction amount which is not affected by acceleration or deceleration.

Figure 9:
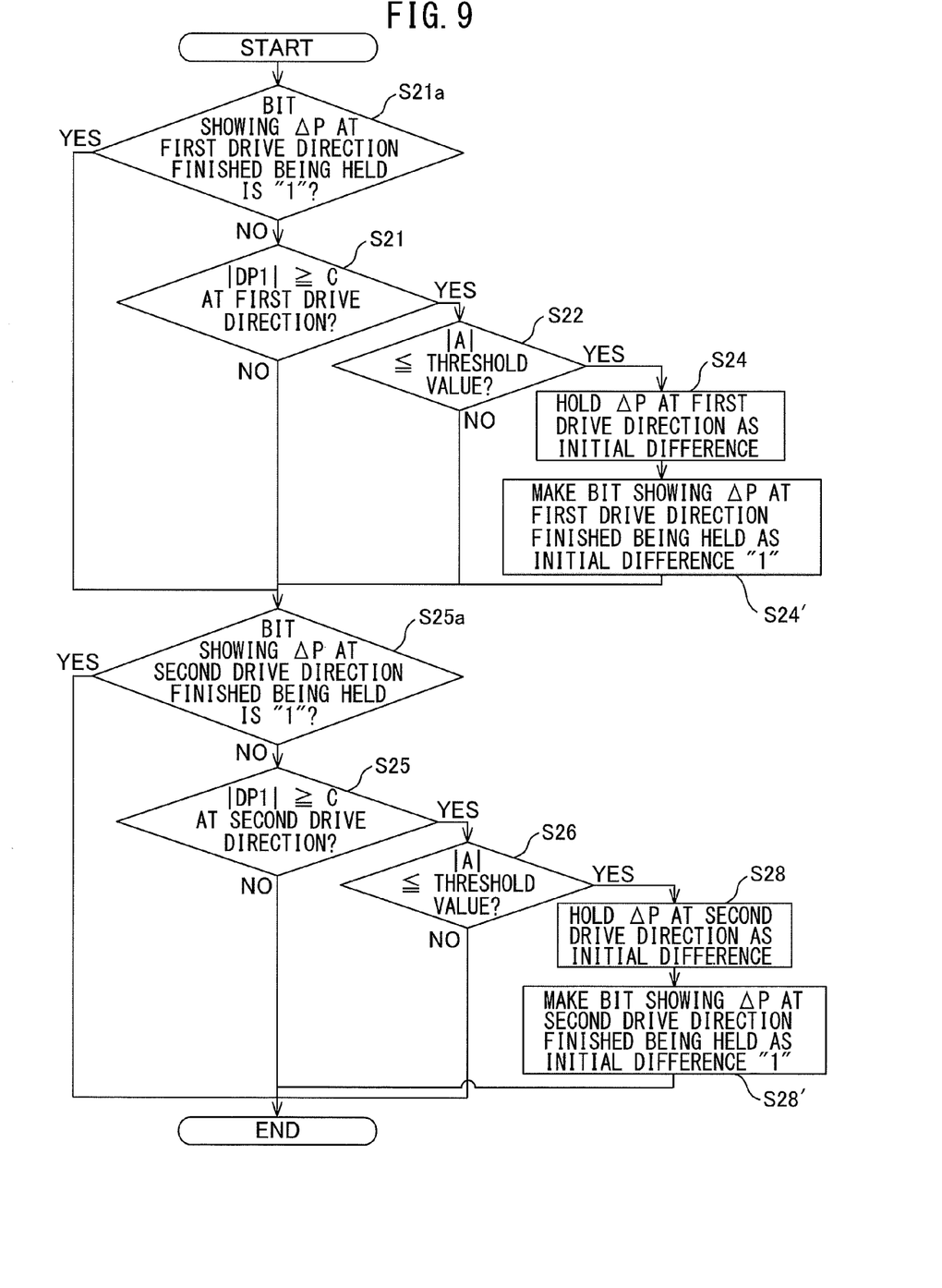
FIG. 9 is still another flow chart for judging if a moving part and a driven part are engaged.

In this case as well, in the same way as explained above, sometimes the initial difference is not updated and sometimes it is updated. FIG. 9 is still another flow chart for judging if the moving part and the driven part are engaged. This is a view similar to FIG. 5. As shown in FIG. 9, a bit is set which shows that the initial difference has been held. When the bit is set, the difference is not updated (step S21a, S25a). Further, as shown at steps S24' and S28', bits are preferably prepared for the first drive direction and second drive direction.

Figure 6:
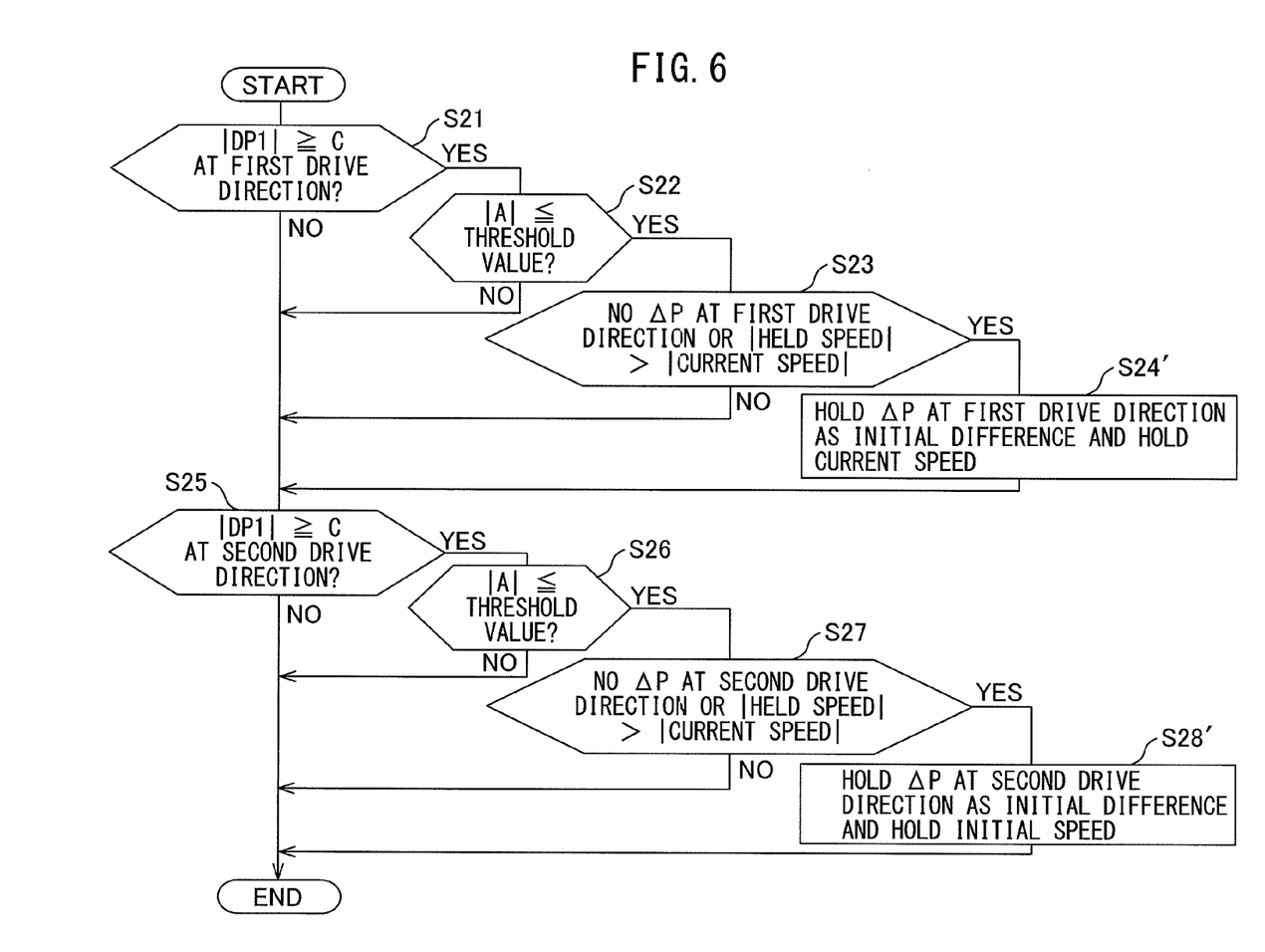
FIG. 6 is a third flow chart for judging if a moving part and a driven part are engaged.

Further, other factors may be used as the basis to judge engagement of the moving part WA and the driven part WB. FIG. 6 is a third flow chart for judging if a moving part and a driven part are engaged. Among the steps which are shown in FIG. 6, repeat explanations of steps similar to those which were explained with reference to FIG. 3 or FIG. 5 will be omitted.

In FIG. 6, when it is judged YES at step S22, the routine proceeds to step S23. At step S23, it is judged if the difference ΔP at the first drive direction is held at the holding part 33. Furthermore, at step S23, the absolute value of the speed which is held at the holding part 33 is compared with the absolute value of the current speed. The held speed and the current speed may be either the speed command value CV or the speed detection value DV. However, it is assumed that the same types of speeds, for example, the held speed command value CV and the current speed command value CV, are compared.

Further, when the difference ΔP in the first drive direction is held at the holding part 33 or when the absolute value of the speed which is held at the holding part 33 is larger than the absolute value of the current speed, the routine proceeds to step S24'. At step S24', the difference ΔP at the first drive direction is held as the initial difference ΔP0. Furthermore, at step S24', the current speed is held at the holding part 33.

Similarly, at FIG. 6, when it is judged YES at step S26, the routine proceeds to step S27. Further, when the difference ΔP in the second drive direction is held at the holding part 33 or when the absolute value of the speed which is held at the holding part 33 is larger than even the absolute value of the current speed, the routine proceeds to step S28'. Further, at step S28', the difference ΔP at the second drive direction is held as the initial difference ΔP0 and the current speed is held at the holding part 33.

When it is judged YES at step S23 and step S27, the current speed of the moving part WA is smaller than the held speed. When the speed of the moving part WA is small in this way, the deformation of the screw N is also small. Therefore, in the flow chart which is shown in FIG. 6, a speed where it is believed that the deformation of the screw N is smaller is employed. Further, if using the initial difference which was held at step S24' or step S28' as the basis to prepare the backlash correction amount, an accurate backlash correction amount free of the influence of deformation of the screw N is found.

Further, the backlash correction amount calculated by the correction amount calculating part 34 will never become larger than the backlash C. Therefore, even if the correction amount calculating part 34 has prepared a backlash correction amount larger than the backlash C, the correction amount calculating part 34 preferably limits the prepared backlash correction amount to the value of the backlash or less. Due to this, it is possible to prevent an abnormally large backlash correction amount from being calculated.

Figure 7:
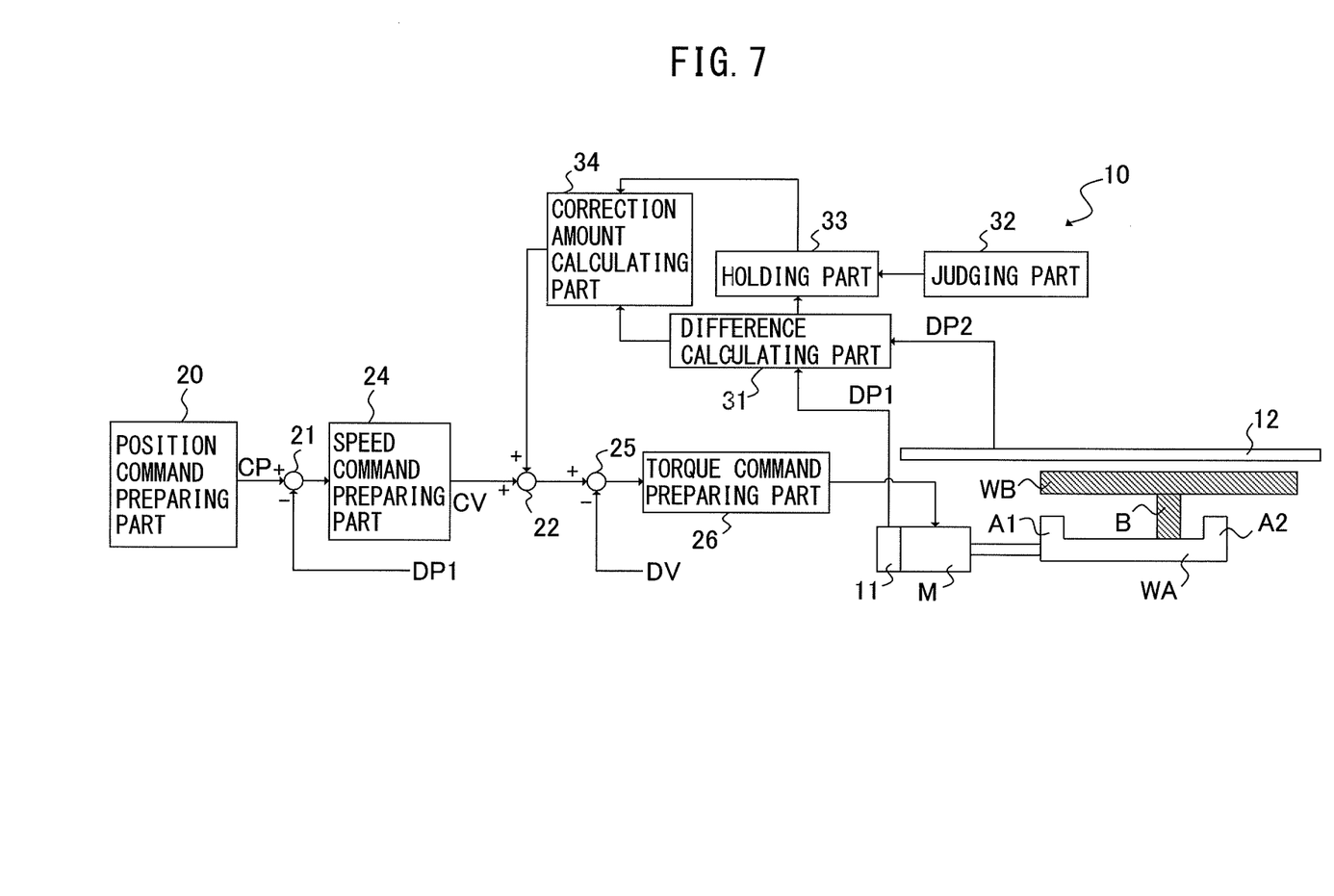
FIG. 7 is a functional block diagram of a motor control system according to a second embodiment of the present invention.

Furthermore, FIG. 7 is a functional block diagram of a motor control system according to a second embodiment of the present invention. In FIG. 7, the first position detection value DP1 from the first position detecting part 11 and the second position detection value DP2 from the second position detecting part 12 are directly input to the difference calculating part 31. Further, the backlash correction amount which was prepared in the same way as explained above by the correction amount calculating part 34 is added at the adder 22 to the speed command value CV. In this case, a suitable conversion coefficient may be multiplied with the backlash correction amount. Even in such a case, it will be clear that advantageous effects similar to those explained above can be obtained.

Effect of the Invention

In the first aspect of the invention, the difference between the current positions of the moving part and the driven part and the initial difference are used as the basis to calculate the backlash correction amount. Therefore, the optimum backlash correction amount for the current positions of the moving part and the driven part can be prepared.

In the second aspect of the invention, when the moving part moves by the backlash or more, it is judged that the moving part has engaged with the driven part, so the fact of the moving part having engaged with the driven part can be judged more reliably.

When the moving part is moving by a constant speed, there is almost no effect by acceleration or deceleration. Therefore, in the third aspect of the invention, there is no deformation of the movement axis of the moving part by acceleration or deceleration and the backlash correction amount can be accurately found.

In the fourth aspect of the invention, both of the position detection values of the first position detecting part which detects the position of the moving part and the second position detecting part which detects the position of the moved part are used to prepare a speed command value so as to enable preparation of a speed command value resistant to vibration even when the backlash between the moving part and the driven part is large.

In the fifth aspect of the invention, by using both of the errors of the first position difference and the second position difference to prepare a speed command value, by controlling the position by the position detection value from the first position detecting part when the change of the position difference is large, the moving part can be moved stably, and by controlling the position by the position detection value from the second position detecting part when the change of the position difference is small, the precision of the position of the moved part can be raised.

The smaller the speed of the moving part, the smaller the deformation of the movement axis of the moving part. Therefore, in the sixth aspect of the invention, by employing a speed giving a smaller deformation of the movement axis of a moving part, the backlash correction amount can be found more accurately.

In the seventh aspect of the invention, the backlash correction amount never becomes larger than the backlash. By limiting the backlash correction amount to the value of the backlash or less, it is possible to prevent an abnormally large backlash correction amount from being calculated.

Typical embodiments were used to explain the present invention, but it will be understood that a person skilled in the art could make the above-mentioned changes and various other changes, deletions, and additions without departing from the scope of the present invention.

The invention claimed is:

1. A motor control system which corrects a backlash between a moving part which is driven by a motor and a driven part which is driven by that moving part, comprising:
    a first position detecting part which detects a position of said moving part,
    a second position detecting part which detects a position of said driven part,
    a difference calculating part which calculates a difference between a first position detection value which said first position detecting part detects and a second position detection value which said second position detecting part detects,
    a judging part which judges if said moving part has engaged with said driven part when said moving part is made to move from any initial position in a first drive direction and in a second driven direction opposite to said first drive direction,
    a holding part which holds said difference calculated by said difference calculating part as initial difference linked with said first drive direction or said second drive direction, when said judging part judges that said moving part has engaged with said driven part, and
    a correction amount calculating part which calculates a backlash correction amount of said backlash,
    wherein said correction amount calculating part using the difference calculated by said difference calculating part based on the current positions of said moving part and said driven part and said initial difference held by said holding part to calculate said backlash correction amount; and
    wherein said backlash correction amount is added to a first position difference between a position command value of the moving part and the first position detection value or is added to a speed command value of the moving part.

2. The motor control system as set forth in claim 1, wherein said judging part judges that said moving part has engaged with said driven part when said moving part moves in said first drive direction or said second drive direction by said backlash or more.

3. The motor control system as set forth in claim 2, wherein said judging part judges that said moving part has engaged with said driven part when said moving part has moved by a certain speed.

4. The motor control system as set forth in claim 1, further comprising
    a position command preparing part which prepares a position command value of said driven part and
    a speed command preparing part which uses a first position difference between said position command value and said first position detection value and a second position difference between said position command value and said second position detection value as the basis to prepare a speed command value.

5. The motor control system as set forth in claim 4, wherein said speed command preparing part applies a low pass filter to a error between said second position difference and said first position difference and adds said first position difference to it to prepare a speed command.

6. The motor control system as set forth in claim 4, wherein said holding part further holds speed command values in said first drive direction and said second drive direction and, when the current speed command value is smaller than a held speed command value, holds said current speed command value as a new speed command value.

7. The motor control system as set forth in claim 1, wherein said correction amount calculating part limits said correction amount of backlash to the backlash amount or less.

* * * * *